June 27, 1967  A. E. PRINCE ETAL  3,328,756
ELEVATOR CAR POSITION INDICATOR
Filed Dec. 9, 1964  2 Sheets-Sheet 1

INVENTOR
ARTHUR ENNIS PRINCE
HENRY LESTER KAUNE
BY W. L. Hunter ATTORNEY

INVENTOR
ARTHUR ENNIS PRINCE
HENRY LESTER KAUNE

BY *W. L. Hunter* ATTORNEY

United States Patent Office 3,328,756
Patented June 27, 1967

3,328,756
ELEVATOR CAR POSITION INDICATOR
Arthur Ennis Prince, Succasunna, N.J., and Henry Lester Kaune, Yorktown Heights, N.Y., assignors to Otis Elevator Company, New York, N.Y., a corporation of New Jersey
Filed Dec. 8, 1964, Ser. No. 416,867
9 Claims. (Cl. 340—21)

ABSTRACT OF THE DISCLOSURE

A rotary indicator actuated electromagnetically through discrete angular increments in response to the position of the elevator car.

This invention relates to apparatus for indicating visually the position of an elevator car in a hatchway.

Elevator installations frequently include devices at one or more landings and in the car to indicate the location of the car to passengers and prospective passengers. One kind of indicator which has been used in the past comprises a rotor to which are affixed a plurality of numerals, corresponding to the various floors, which numerals are viewed through a window in a face plate. The rotor is turned with a step by step motion with the aid of a plurality of permanent magnets mounted on the rotor which cooperate with a pair of stationary electromagnets which are energized with one polarity or the other as the car travels in the hoistway. Such devices have a number of advantages, including the minimization of the number of conductors required to operate each device. However, they are in general subject to the disadvantage that, as the rotor is stepped to each position, it tends to overshoot its mark and to oscillate, or hunt, briefly about its final position, causing an unsteady visual indication.

An indicator of the kind briefly discussed above is described in detail in U.S. Patent No. 2,686,907 to A. W. Paulson, issued Aug. 17, 1954, entitled "Elevator Car Position Indicator Apparatus." The device described in the patent includes a friction brake on the rotor which reduces the tendency of the rotor to overshoot and oscillate. However, it has been found to be very difficult to adjust the brake for proper operation. A braking force sufficient to prevent oscillation is frequently sufficient to prevent the apparatus from starting, or to make starting doubtful. It has therefore been necessary to find a compromise which usually turns out to be an adjustment for which a certain amount of oscillation must be tolerated in exchange for certainty of operation.

It is a general object of the present invention to provide an improved elevator car position indicator.

Another object is to provide a car position indicator in which the indicatng element comes to rest at the proper postion without oscillation.

Another object is to provide a car position indicator which operates reliably with but a moderate amount of applied power.

Briefly stated, one embodiment of the invention comprises numerals corresponding to floors carried on the outer rim of a rotor which are viewed through a lens in the face plate. The inner rim of the rotor carries a pluality of permanent magnets equally spaced circumferentially and alternately arranged with opposite polarity. Two stationary electromagnets, each having pole pieces, are positioned inside the rim for cooperation with the permanent magnets in a manner to effect rotation of the rotor. The pole pieces of one electromagnet are angularly displaced from those of the other to such an extent that when the pole pieces of one electromagnet are aligned with the permanent magnets, the pole pieces of the other electromagnet are aligned with the spaces between permanent magnets. The coils of the electromagnets are energized alternately so that the excited pole pieces are of a polarity to interact with the next adjacent permanent magnet to step the rotor one half of a rotor magnet pitch distance at a time, which corresponds to one step of floor indication.

Two latches operate alternately as the rotor reaches successive floor indications to hold the rotor stationary. Energization of one of the electromagnets to advance the rotor simultaneously releases the operative latch so that the rotor rotates freely. When the next floor position is reached, the other latch operates automatically to stop the rotor and prevent further movement until the other electromagnet is energized.

For a clearer understanding of the invention reference may be made to the following detailed description and the accompanying drawing, in which.

Figure 1:
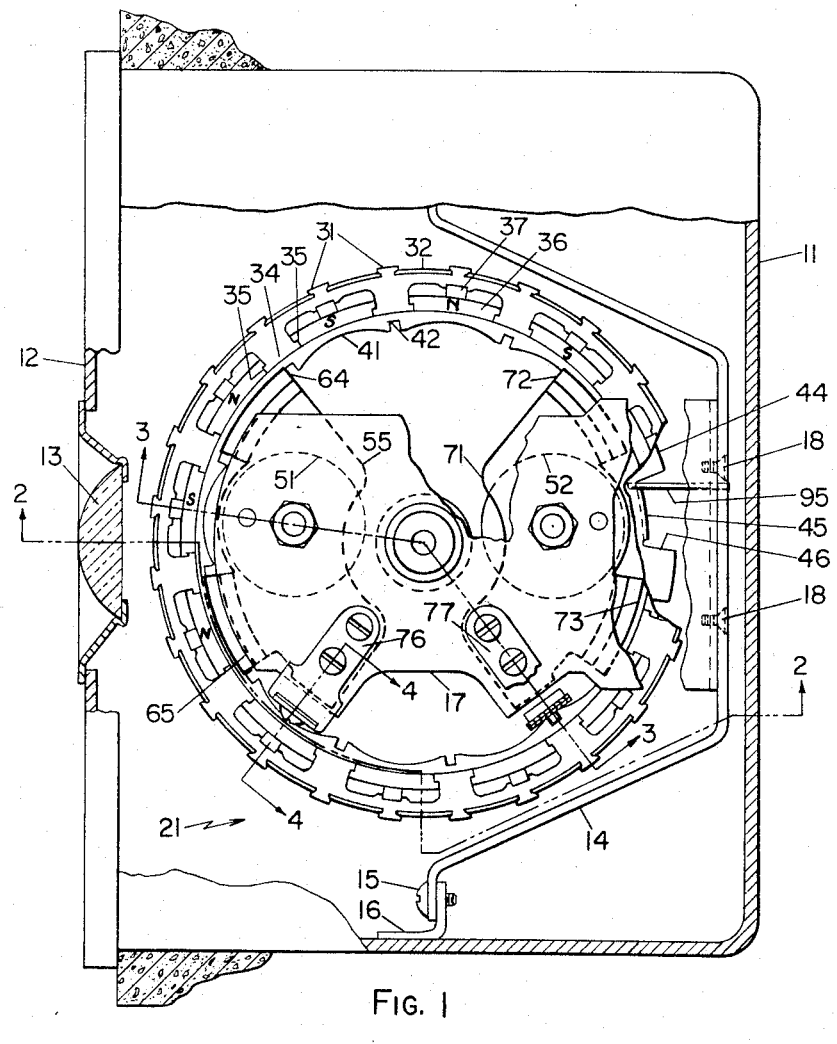
FIGURE 1 is a plan view of one embodiment of the invention with some of the parts broken away.
Figure 2:
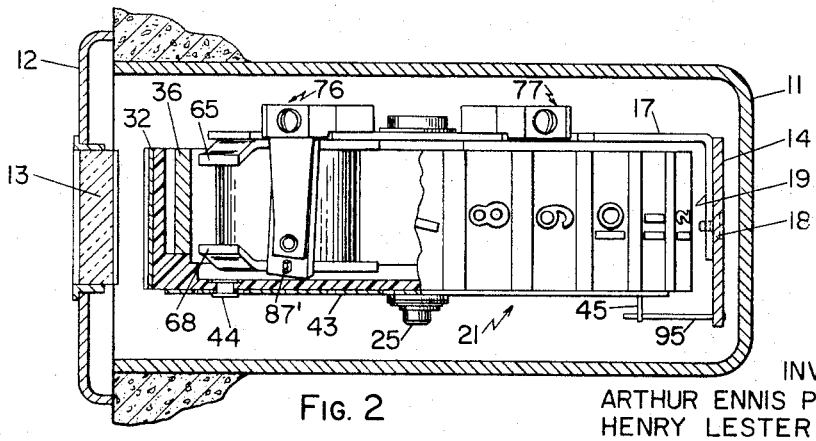
FIGURE 2 is a cross section view taken along the line 2—2 of FIGURE 1.

Referring first to FIGURES 1 and 2, there is shown an outlet box 11 the open end of which is covered by a face plate 12 in an aperture of which is mounted a lens 13 through which the floor indications are viewed. A chair bracket 14 is fastened to the box 11 by screws, such as the screw 15, threaded into an angle 16 fastened to the box 11. A rigid plate 17, made of non-magnetic material such as brass, is fastened to the chair bracket 14 by screws 18 passing through the bracket 14 and threaded into a bent over portion 19 of the plate 17. All of the operative parts of the indicator are supported by the plate 17.

Figure 3:
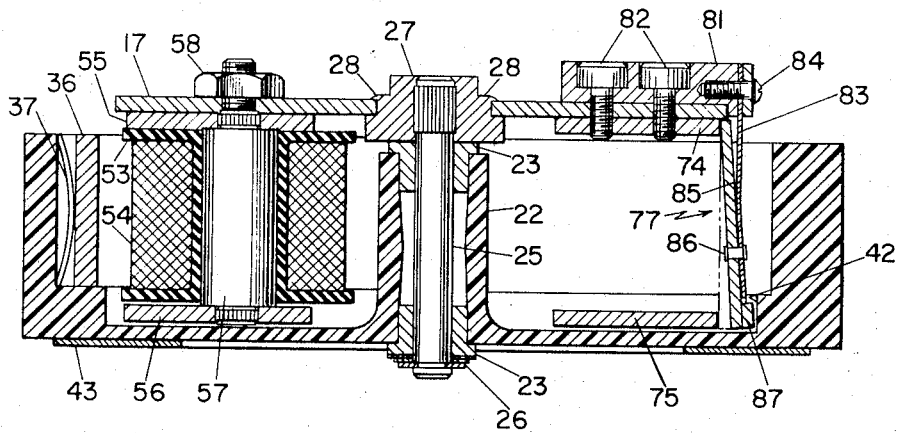
FIGURE 3 is a cross section view taken along the line 3—3 of FIGURE 1.

A cup shaped rotor, indicated generally by the reference character 21, made of non-magnetic material such as a molded plastic, is rotatably supported by the plate 17. As best shown in FIGURE 3, the central portion of the rotor 21 is formed with an upstanding tubular portion 22 into which are fitted two bushings 23. A rod 25 passes through the bushings 23 and has affixed thereto at its lower end a retaining ring and washer assembly 26 which supports the lower bushing 23 and the rotor 21. The upper end of the rod 25 is slightly enlarged and formed with straight axial knurling. The knurled portion fits tightly into an axial bore in a hub 27 which in turn passes through a central aperture in the plate 17. The lower portion of the hub 27 is of enlarged diameter and bears against the underside of the plate 17, while the upper portion is "spun over" as shown at 28 thereby clamping the hub 27 to the plate 17. The result is that the rotor 21 is supported by the plate 17 and is freely rotatable about the shaft 25.

The rim of the rotor has a complex shape. As best shown in FIGURES 1 and 2, the outer edge is formed with twenty-four equally spaced, keystone shaped, radially outwardly extending projections 31 which define twenty-four recesses into which are placed twenty-four cards or plates 32 each bearing a different character to indicate the floor at which the elevator car is located. The cards 32 are readily replaceable to accommodate different floor designations and the characters thereon may be either numerals or letters or both. For illustrative purposes it is assumed that the cards bear the numerals 1 to 24 inclusive. As the rotor 21 revolves, different numerals are visible through the lens 13.

The inner edge of the rim, except near the bottom, is formed with twelve equally spaced, radially inwardly extending projections 34, one opposite every other one of the projections 31, each with two circumferentially extending portions 35. The projections 34 and the portions 35 define twelve recesses into which are placed twelve permanent magnets 36, polarized in a direction parallel to the shaft 17 or vertically, as viewed in FIGURE 2. Twelve leaf springs 37 hold the magnets in place. Adjacent magnets are oriented with opposite polarity. Progressing circumferentially, the upper ends of the magnets, as viewed in FIGURE 1, are polarized north and south, alternately. The bottom ends of each magnet are, of course, of opposite polarity.

The bottom of the rim, below the level of the magnets and radially inward therefrom, is formed with twelve concave cam surfaces 41 alternating with twelve narrow rectangular indentations or slots 42. These cam surfaces and slots constitute a lock ring which cooperates with detents, as will be fully explained.

As best shown in FIGURE 2, a thin metal disc shaped stop ring 43, having a large central aperture, is riveted as shown at 44 to the bottom of the rotor 21. The ring 43 is formed with twenty-four equally spaced, radially outwardly extending projections around its periphery, three adjacent ones of which, the projections 44, 45 and 46, are shown in FIGURE 1. The middle projection 45 has been bent downwardly, as shown in FIGURE 2, for a purpose to be described.

Also supported by the plate 17 are two electromagnets, the outlines of which are shown at 51 and 52 in FIGURE 1. As best shown in FIGURE 3, the electromagnet 51 comprises an insulating spool 53 carrying a winding 54, two pole pieces 55 and 56, and a cylindrical core 57. The top and bottom portions of the core 57 are formed with reduced diameter knurled portions which are fitted tightly into apertures in the pole pieces 55 and 56 respectively, maintaining them in proper alignment. The uppermost portion of the core 57 is threaded and passes through an aperture in the plate 17 and is fastened thereto by a nut 58, thus fastening the entire electromagnet assembly securely to the plate 17. The electromagnet 52 is similar in all respects.

As shown in FIGURE 1, the pole piece 55 is formed with two main arms 64 and 65 which extend radially to positions adjacent to the tops of the permanent magnets 36 on the rotor. The circumferential width of each arm is slightly greater than the width of a permanent magnet in order to prevent the electromagnet assembly from constituting a magnetic lock when de-energized. Even when the electromagnet 51 is de-energized, lines of flux pass from the permanent magnet to the adjacent pole piece arm. If the arm were the same width, the rotor could not rotate from the position shown without causing a substantial change in the number of flux linkages. However, with the arms 64 and 65 wider than the adjacent permanent magnets, the rotor can start to rotate without a large change in flux linkages in this region, thereby reducing the starting torque required. The center lines of the arms 64 and 65 are angularly spaced apart by twice the angular distance between center lines of adjacent permanent magnets so that the two arms are adjacent to permanent magnets of the same polarity orientation. It would be possible to provide only one arm but two or more are preferred in order to increase the torque. With the parts in the positions shown in FIGURE 1, each of the arms 64 and 65 is directly opposite a permanent magnet the top end of which is a north pole. The arms 64 and 65 are each formed with a downwardly offset end portion, as shown in FIGURE 2 for the arm 65.

Figure 4:
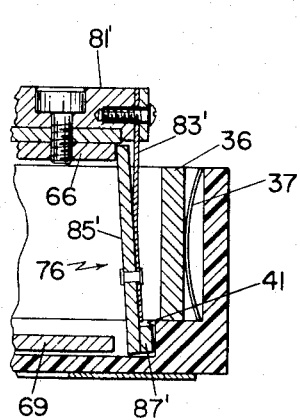
FIGURE 4 is a fragmentary cross section view taken along the line 4—4 of FIGURE 1.

The pole piece 55 is also formed with a shorter and narrower auxiliary arm 66, best shown in FIGURE 4, which cooperates with a detent, as will be fully explained.

The bottom pole piece 56 is also formed with two main arms located directly beneath the arms 64 and 65 and having exactly the same shape except that the ends are turned upwardly, as shown in FIGURE 2 for the arm 68. The bottom pole piece 56 is also formed with a shorter and narrower auxiliary arm 69, shown in FIGURE 4, which is located directly beneath the arm 66.

The electromagnet 52 is similarly provided with upper and lower pole pieces, the upper pole piece 71 being shown in FIGURE 1. The pole piece 71 is formed with two main arms 72 and 73 (similar to the arms 64 and 65) extending to positions adjacent to the permanent magnets of the rotor and formed with downwardly turned ends. The pole piece 71 is also formed with a shorter, narrower auxiliary arm 74, shown in FIGURE 3, which also cooperates with a latch. The lower pole piece of the electromagnet 52 is formed with three similar arms, located directly beneath the corresponding arms of the upper pole piece 71. The auxiliary arm 75 is shown in FIGURE 3. The center lines of the arms 72 and 73 (FIGURE 1) are also angularly spaced apart by twice the angular distance between centerlines of adjacent permanent magnets. In the position of the parts shown in FIGURE 1 the center lines of the arms 72 and 73 are aligned, not with the centerlines of the permanent magnets (as is the case for arms 64 and 65), but with the spaces between adjacent magnets. Stated another way, each of the arms 72 and 73 is opposite one half of one permanent magnet and one half of the adjacent permanent magnet.

A pair of latches 76 and 77 are provided to hold the rotor 21 in position and to prevent oscillation each time the rotor is stepped to a new position. These latches are associated with the auxiliary arms of the pole pieces. As best shown in FIGURE 3, the latch 77 comprises a keeper plate 81 fastened to the plate 17 by screws 82 passing through the keeper plate 81 and threaded into the plate 17, the ends of the screws extending into apertures in the pole piece arm 74. A leaf spring 83 is fastened to the keeper plate 81 by a screw 84. An armature 85 is fastened to the spring 83 by a rivet 86 and cooperates with the pole piece arms 74 and 75. The spring 83 urges the armature 85 to the right, as viewed in FIGURE 3. With the rotor in the position shown in the drawing and with the electromagnets de-energized, a projection 87 on the end of the armature 85 constitutes a detent and engages one of the slots 42 of the rotor 21, holding the rotor stationary. Energization of the electromagnet 52 attracts the armature 85 into engagement with both pole piece arms 74 and 75, to the position shown dotted, withdrawing the detent 87 from the slot 42 and freeing the rotor for rotation.

FIGURE 4 shows the latch 76 which is identical to the latch 77 and corresponding parts are denoted by like but primed reference characters. However, with the rotor 21 in the same position, the detent 87' bears on the cam surface 41 and, as far as the latch 76 is concerned, the rotor can rotate.

With the parts in the positions shown in the drawing, the apparatus displays the numeral 1 through the lens 13. The latch 77 is engaged and holds the rotor 21 stationary. To display the numeral 2, the rotor must be turned clockwise through an angle equal to one half the angle between center lines of adjacent permanent magnets. This requires that the electromagnet 52 be energized with direct current of such polarity as to make the pole piece 71 a north pole. When so energized, the arms 72 and 73 both become north poles and the adjacent permanent magnets having south poles at their upper ends, as shown, are attracted to the arms 72 and 73. At the same time, the armature 85 (FIGURE 3) withdraws the projection 87 from the slot 42. Accordingly, the rotor is advanced an angular distance equal to one half the angular distance between adjacent permanent magnets. When so advanced, the projection 87' of the latch 76 (FIGURE 4) enters one of the slots 42, stopping the rotor 21 and holding is stationary. The numeral 2 is now displayed.

To advance the rotor another step, the electromagnet 51 is energized with direct current of such polarity as to make the pole piece 55 and the arms 64 and 65 north poles so as to attract the south poles of those permanent magnets which are now adjacent thereto. At the same time, the latch 76 is released, the rotor is advanced to display the numeral 3, and the latch 77 is engaged. The next advance, to numeral 4, requires that the electromagnet 52 be energized with opposite polarity to make the arms 72 and 73 south poles. In general, successive advances in the same direction require that the first electromagnet be energized with a first polarity; next, that the second electromagnet be energized with the first polarity; next, that the first electromagnet be energized with the opposite polarity; next, that the second electromagnet be energized with the opposite polarity; whereupon the cycle is repeated.

A circuit to obtain energization of the electromagnets as above described can take many forms. For illustrative purposes it is assumed that the elevator installation includes a "selector" in the machine room. "Selectors" are well known and may include, among other things, a plurality of fixed floor contacts spaced apart a distance representing the distance between floors to a reduced scale and a crosshead which follows the motion of the car in the hoistway at the same reduced scale. The crosshead carries brushes which cooperate with the floor contacts.

Figure 5:
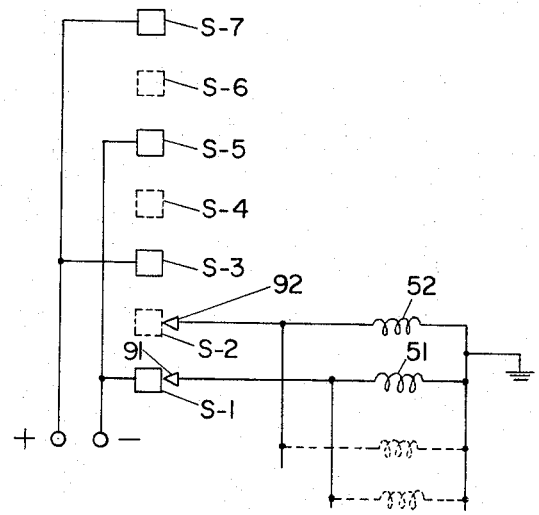
FIGURE 5 is a schematic wiring diagram.

FIGURE 5 illustrates a suitable circuit for a seven floor installation. There are shown floor contacts S–1 through S–7. Only the odd numbered contacts are used, the even numbered contacts being shown dotted. Two brushes 91 and 92 are spaced apart a distance corresponding to the scale distance between floors and are mechanically connected together and to the crosshead. As the car moves upward, the brushes make contact with the various floor contacts successively. Alternate odd numbered contacts S–1, S–5, etc. are connected to a direct current source having negative potential with respect to ground; the remaining odd numbered contacts S–3, S–7, etc. are connected to a direct current source having positive potential with respect to ground. The winding of electromagnet 51 is connected between the brush 91 and ground; the winding of electromagnet 52 is connected between the brush 92 and ground. The electromagnets of additional floor position indicators may also be connected between brushes 91 and 92 and ground, as shown in dotted outline.

It will be assumed for illustrative purposes that the terminals of the electromagnets are connected so that energization with positive polarity makes the upper pole pieces 55 and 71 north poles and that energization with negative polarity makes them south poles. With the parts in the positions shown in the drawing, the car is at the first floor, the indicator displays the numeral 1, the electromagnet 52 is de-energized, the latch 77 is engaged, the electromagnet 51 is energized with negative polarity, the pole piece arms 64 and 65 are south poles, opposite north poles of the permanent magnets, the latch 76 is disengaged, and the rotor is stationary. As the car leaves the first floor, the brush 91 leaves the contact S–1 de-energizing the electromagnet 51 and releasing the latch 76 which assumes the position shown in FIGURE 4 with the projection 87' engaging the cam surface 41. As the car approaches the second floor the brush 92 engages the contact S–3 energizing the electromagnet 52 with positive polarity, releasing the latch 77, making the pole piece arms 72 and 73 north poles, attracting the south poles of the adjacent permanent magnets and advancing the rotor to display the numeral 2, whereupon the latch 76 engages a slot 42. As the car leaves the second floor and approaches the third, the electromagnet 52 is de-energized, the brush 91 makes contact with the contact S–3 energizing the electromagnet 51 with positive polarity and advancing the rotor as previously explained. It is apparent that continued motion of the car energizes the electromagnets 51 and 52 alternately with alternate polarity.

An additional feature of the apparatus not previously described is the limit stop mechanism. The apparatus illustrated has provision for indicating up to twenty-four floors but can be used with any lesser number. The previously mentioned stop ring 43 (FIGURES 1 and 2) cooperates with a stop pin 95 fastened to the chair bracket 14 and extending to the left, as viewed in FIGURES 1 and 2, underneath the main body of the rotor 21 at a position to engage a bent down projection of the stop ring 43. In the positions of the parts shown in the drawing, the elevator is at the first floor and the numeral 1 is displayed. The projection 45 is bent downward and engages the stop pin 95, preventing further counterclockwise rotation of the rotor 21. Another projection (not shown) is also bent down to limit the clockwise rotation of the rotor 21 to an indication corresponding to the top floor of the particular installation, for example, the seventh. Thus the device can be used for any number of floors up to and including twenty-four.

The limitation of rotation serves to re-establish synchronism of the device with the position of the elevator car if, for any reason, the device should get out of step. The next time the car travels to both terminal landings, the stop ring 43 and the stop pin 95 prevent overtravel of the indicator and re-establish synchronism.

It is apparent that the present invention provides an improved elevator car position indicator. The floor indications change from one floor to the next with a crisp and definite single continuous movement, rather than with two or more discrete movements as is the case with some prior art indicators, thereby eliminating the appearance of erratic operation. As each new position indication appears, the rotor is quickly and positively brought to a stop and locked at the proper position, without oscillation or hunting. Only a moderate amount of power is required for positive and reliable operation because the lock mechanism is released each time the rotor is advanced.

Although a specific embodiment of the invention has been described in considerable detail for illustrative purposes, many modifications will occur to those skilled in the art. It is therefore desired that the protection afforded by Letters Patent be limited only by the true scope of the appended claims.

What is claimed is:
1. An elevator car position indicator, comprising,
   a rotor element bearing floor indicating characters and driven with a step by step motion by repetitive energization of an electromagnetic device,
   lock means including first and second latches operable alternately for normally preventing rotation of said element, and
   means for unlocking said lock means in response to energization of said device.
2. An elevator car position indicator, comprising,
   a pair of electromagnets,
   a rotor bearing floor indicating characters and driven with a step by step motion by alternate energization of said electromagnets,
   a pair of latches each associated with one of said electromagnets and operative alternately to lock said rotor against movement, and
   means responsive to energization of each of said electromagnets for unlocking its associated latch.
3. An elevator car position indicator, comprising,
   a rotor bearing floor indicating characters and including a plurality of permanent magnets,
   a stator including a pair of electromagnets cooperating with said permanent magnets, means for energizing said electromagnets alternately in response to movement of said car from floor to floor, whereby said rotor rotates with a step by step motion to successive floor indicating positions, a pair of latches each associated with one of said electromagnets and operative alternately as said rotor reaches successive floor indicating positions for locking said rotor against movement, and means responsive to the energization of each of said electromagnets for unlocking its associated latch.

4. An elevator car position indicator, comprising, an electromagnetic step motor rotated to successive angular positions by the alternate energization of a pair of electromagnets in response to the travel or the car to successive floors, a plurality of characters on said motor one of which is brought to a viewing position each time said motor is stepped, a pair of latches each resiliently urged toward a locking position and operative alternately to lock said motor as each successive character is brought into view, whereby oscillation of said motor is prevented, and means for withdrawing the then operative one of said latches from locking position in response to energization of said electromagnets.

5. An elevator car position indicator, comprising, a rotor element carrying characters indicative of position on its periphery, a plurality of permanent magnets mounted on said rotor element in a circular array coaxial with the rotational axis thereof with their magnetic axes parallel to said rotational axis and oriented with the north poles of adjacent magnets extending toward opposite ends of said rotor element, a pair of electromagnets stationarily mounted with pole pieces adjacent to said permanent magnets, means for energizing said electromagnets alternately as the elevator car reaches successive floors whereby said rotor element is turned in discrete steps to successive positions to display different characters indicative of the position of the car, a pair of latches operative alternately as said rotor element reaches each discrete position for engaging said rotor and locking it against rotation, and means operative in response to energization of said electromagnets for disengaging the then engaged one of said latches.

6. An elevator car position indicator, comprising, a cylindrical rotor having a plurality of equally spaced permanent magnets mounted parallel to the axis of said rotor to provide alternate north and south poles at both ends of said rotor, and carrying a plurality of floor indicating characters, a stator comprising a pair of electromagnets each having a pair of pole pieces cooperating with said permanent magnets to effect rotation of said rotor, said pole pieces of one electromagnet being disposed midway between adjacent permanent magnets when the pole pieces of the other electromagnet are in line with said permanent magnets, means responsive to movement of said car to successive floors for causing alternate energization of said electromagnets, each successive energization of each electromagnet being of opposite polarity, whereby such energization causes step by step movement of said rotor to successive discrete angular positions, a pair of latches operative alternately when said rotor is at each discrete position for locking said rotor against movement, and means responsive to energization of said electromagnets for unlocking the then operative one of said latches.

7. An elevator car position indicator, comprising, a cylindrical rotor having a plurality of equally spaced permanent magnets mounted parallel to the axis of said rotor to provide alternate north and south poles at both ends of said rotor, and carrying a plurality of floor indicating characters, a stator comprising a pair of electromagnets each having a pair of pole pieces cooperating with said permanent magnets to effect rotation of said rotor, said pole pieces of one electromagnet being disposed midway between adjacent permanent magnets when the pole pieces of the other electromagnet are in line with said permanent magnets, means responsive to movement of said car to successive floors for causing alternate energization of said electromagnets, each successive energization of each one of said electromagnets being of opposite polarity, said rotor including a lock ring formed with a plurality of circumferentially disposed slots and with a plurality of cam surfaces joining said slots, a pair of stationarily mounted latches each associated with one of said electromagnets, each latch including a projection resiliently urged into engagement with said lock ring, said latches being disposed so that when one projection is opposite a slot the other projection is opposite a cam surface, and means for withdrawing each of said projections from engagement with said lock ring when its associated electromagnet is energized.

8. An elevator car position indicator, comprising, a cylindrical rotor having a plurality of equally spaced permanent magnets mounted parallel to the axis of said rotor to provide alternate north and south poles at both ends of said rotor and carrying a plurality of floor indicating characters, a stator comprising first and second electromagnets each including a winding and first and second oppositely disposed pole pieces, each pole piece including a plurality of main arms and an auxiliary arm, said main arms each extending radially toward but not touching said permanent magnets, said main arms of said first electromagnet being disposed midway between adjacent permanent magnets when the main arms of said second electromagnet are in line with said permanent magnets, means responsive to movement of said elevator car to successive floors for energizing said windings alternately, each successive energization of each winding being of opposite polarity, whereby such energization causes said main arms to attract said permanent magnets to cause step by step angular movement of said rotor, said rotor including a lock ring formed with a plurality of circumferentially disposed slots and with a plurality of cam surfaces joining said slots, and a pair of latches each associated with one of said electromagnets, each latch including an armature formed with a projection, each latch including a spring acting on said armature and urging said projection into engagement with said lock ring, each armature being mounted adjacent to said auxiliary arms of said pole pieces associated with one of said electromagnets, said auxiliary arms and latches being disposed so that when one of said projections is opposite one of said slots the other projection is opposite one of said cam surfaces, whereby energization of each of said windings attracts its associated armature against the urging of its spring and withdraws its corresponding projection out of engagement with said lock ring.

9. An elevator car position indicator, comprising, a cylindrical rotor having a plurality of equally spaced permanent magnets mounted parallel to the axis of said rotor to provide alternate north and south poles at both ends of said rotor and carrying a plurality of floor indicating characters, a stator comprising first and second electromagnets each including a winding and a pair of oppositely disposed pole pieces, each pole piece including a plurality of main arms and an auxiliary arm, said main arms extending radially toward but not touching said permanent magnets, said main arms of said first electromagnet being disposed midway between adjacent permanent magnets when the main arms of said second electromagnet are in line with said permanent magnets, means responsive to movement of said elevator car to successive floors for energizing said windings alternately, each successive energization of each winding being of opposite polarity, whereby such energization causes said main arms to attract said permanent magnets to cause step by step angular movement of said rotor, said rotor including a lock ring formed with a plurality of equally spaced apart indentations arranged in a circular pattern, and a pair of stationarily mounted latches each associated with one of said electromagnets, each of said latches including a detent, each of said latches including a spring urging said detent into engagement with said lock ring, whereby as said lock ring rotates it makes a sliding contact with said detent until an indentation moves opposite thereto whereupon said spring urges said detent into said indentation thereby stopping said rotor, said latches being relatively positioned so that when one detent is opposite an indentation the other detent is midway between indentations, each latch being disposed relative to its associated electromagnet so that when said main arms are midway between adjacent permanent magnets said detent is opposite an indentation and when said main arms are aligned with said permanent magnets said detent is midway between adjacent indentations, each latch including an armature mechanically connected to its associated spring and detent and positioned adjacent to opposite auxiliary pole piece arms to be attracted thereby upon energization of its associated winding so as to withdraw said detent from engagement with said lock ring.

References Cited

UNITED STATES PATENTS 3,242,476  3/1966  Neeson _____ 340—324

NEIL C. READ, *Primary Examiner.*

A. WARING, *Assistant Examiner.*